Aug. 17, 1965   N. S. CRESWICK   3,200,997
BEVERAGE DISPENSER
Filed July 11, 1962

INVENTOR
NORMAN S. CRESWICK
BY
HIS ATTORNEYS

United States Patent Office 3,200,997
Patented Aug. 17, 1965

3,200,997
BEVERAGE DISPENSER
Norman S. Creswick, Middletown, N.J., assignor to Thomas J. Lipton, Inc., Hoboken, N.J., a corporation of Delaware
Filed July 11, 1962, Ser. No. 209,032
4 Claims. (Cl. 222—145)

This invention relates to improvements in dispensing devices and it relates to an improved form of valve for devices for dispensing finely divided materials such as powdered tea, powdered coffee and the like to make hot or iced drinks therefrom.

Devices have been provided heretofore wherein a powdered material such as powdered instant tea can be dispensed into heated water and mixed therewith and discharged into a cup as hot tea or into a glass filled with ice to make iced tea. The dispensing valves for these prior devices are solenoid controlled and actuated by means of alternating current. In such solenoid actuated valves, the solenoid coil opens the valve and holds it open as long as an energizing current is applied to the coil. With alternating current, due to the current reversal, the valve has a slight reciprocating movement which aids the flow of powdered material through the valve. However, the particles sometimes cling together and the opening movement of the valve and the slight vibrations thereof are insufficient to prevent the material from bridging so that less than the desired amount of the powdered material is discharged, and a weak drink is prepared.

In accordance with the present invention, the electrical circuit for actuating the dispensing valve is modified to cause the valve to vibrate with greater amplitude, thereby preventing bridging of the powdered material and assuring a positive discharge of the material therethrough.

More particularly, in accordance with the present invention, a half-wave rectifier is inserted in a circuit including the solenoid coil of the dispensing valve so that the alternating current for energizing the coil is converted into a pulsating direct current with the result that the valve is caused to vibrate at about one-half its normal frequency and with a substantial increase in its amplitude of movement. In this way, not only is the valve lifted from its seat to permit the passage of finely divided material and the like but it also is reciprocated through a relatively wide amplitude with the result that bridging and hanging of the finely divided material is prevented and a predetermined and accurately controlled charge of the material is caused to pass through the valve.

Figure 1:
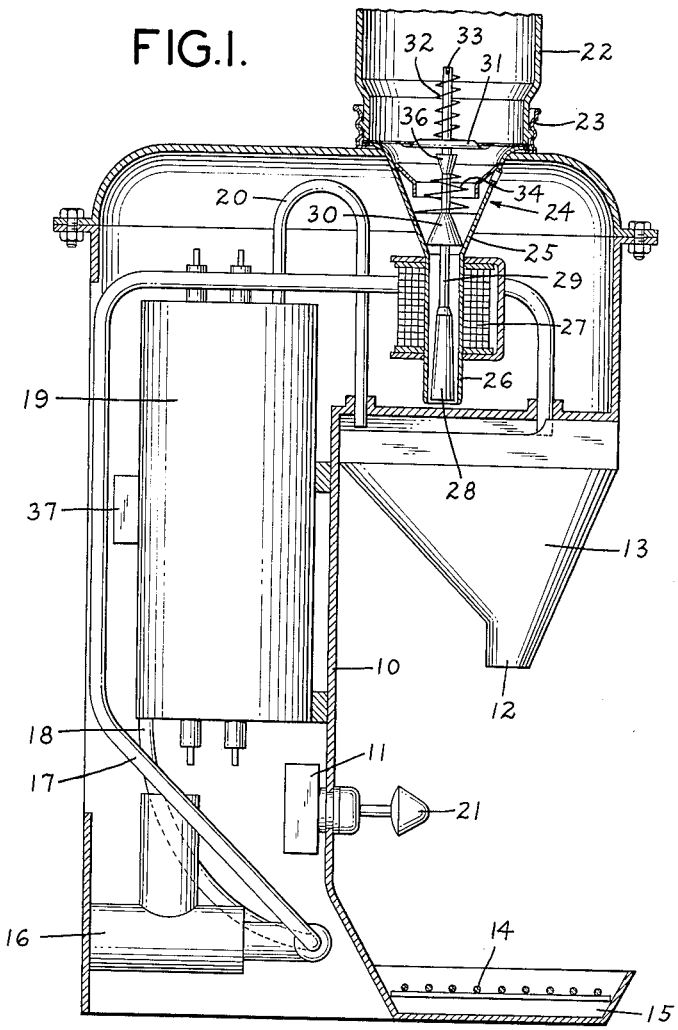
Figure 2:
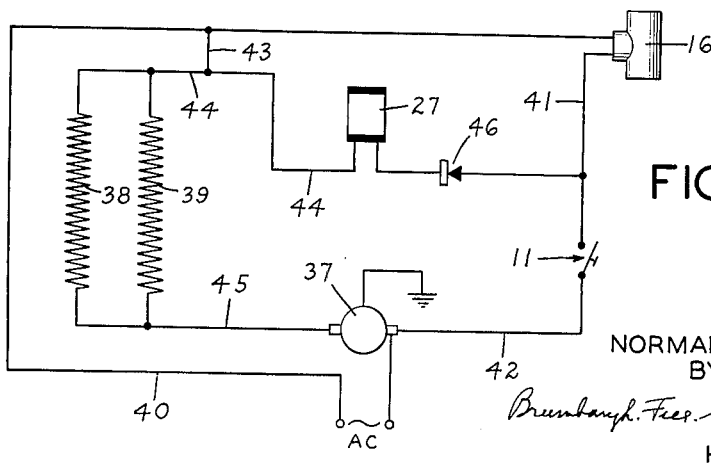

For a better understanding of the present invention, reference may be had to the accompanying drawing in which:

FIGURE 1 is a view partially in side elevation and partially broken away of a typical dispensing device embodying the present invention for dispensing instant tea for the preparation of iced tea; and FIGURE 2 is a schematic wiring diagram of the dispensing device.

For purposes of illustration, the invention is disclosed as applied to a device which may be used in restaurants, drug stores and the like for the preparation of iced tea from powdered or finely divided instant tea concentrates. The apparatus includes a housing 10 in which is mounted a control switch 11 adapted to be depressed by pressing against the switch a glass for receiving the liquid beverage which is discharged through a nozzle 12 at the bottom of the mixing chamber 13. The glass is adapted to rest on a grille work 14 in a suitable drip tray 15 at the forward lower end of the housing 10. Within the lower portion of the housing 10 is mounted a solenoid controlled valve 16 which regulates the flow of cold tap water from a suitable source and diverts it through two conduits 17 and 18 in a predetermined ratio. For example, about one fourth of the water flows through the conduit 18 into a heating unit 19 and is discharged therefrom through a conduit 20 into the mixing chamber 13 and into the glass through the nozzle 12. The remaining four fifths of the water flows through the conduit 17 and is also discharged into the mixing chamber 13 and glass. Mixing of the hot and cold water occurs in the chamber 13 to provide a temperature high enough to dissolve instant tea, but not too hot to be chilled by ice in the glass. The valve 16 is actuated to allow water to flow so long as the glass or other container is pressed against the actuating button or knob 21 of the switch 11.

The finely divided instant tea is contained in a glass jar 22 or the like which is screwed into a receptacle 23 on the top of the housing 10. Mounted within the housing is a valve member 24 which includes a conical portion 25 and a tubular portion 26 which supports the coil 27 for actuating the valve controlling the discharge of the instant tea powder. The valve includes an armature member 28 disposed within the tubular section 26 and of smaller size than the internal diameter of the tube to enable the powdered tea to flow around it. Above the armature 28 and connected by means of a stem 29 to the armature is a frusto conical valve member 30 which is adapted to seat against the downwardly converging sides of the conical nozzle portion 25. The stem 29 extends upwardly beyond the valve member 30 through a supporting flexible diaphragm 31. A spring 32 extends around the upper end of the stem and through a hole 33 therein and bears against the upper surface of the diaphragm 31. Another spring 34 bears against the inside of the conical portion 25 at one end and against an enlargement 36 on the valve stem so that the weight of the valve stem and armature are substantially balanced and the valve plug 30 normally rests against and prevents flow of the material through the conical nozzle portion 25. However, when the coil 27 is energized, the magnetic flux in the coil lifts the armature and the valve plug 30 to the extent governed by engagement of the enlargement 36 on the valve stem with the diaphragm 31. By changing the position of the enlargement, different amounts of the finely divided material can be discharged from the jar 22.

The dispenser thus far described is largely conventional and operates in the following manner. The temperature of the heater is maintained at about 190° F. by means of a thermostat 37 which is mounted on the heater 19 containing the resistance heating elements 38 and 39 in the heating unit 19.

As shown in FIGURE 2, a circuit is completed from the A.C. source through the conductor 40, the solenoid valve 16, conductor 41, switch 11, conductor 42 to the other terminal of the A.C. source, when the switch 11 is closed. Also, the heating units 38 and 39 are energized by a current flowing through the conductor 40, conductor 43, conductor 44, the heating elements 38, 39 the conductor 45 and thermostat 37 to the other terminal of the A.C. source. Likewise current is conducted by means of conductors 40, 43, 44 through the solenoid coil 27, conductor 41, switch 11, conductors 42 so that the solenoid valve 16 is energized to admit water and the coil 27 maintains the valve 24 open so long as the switch 11 is closed.

As shown particularly in FIGURE 2 and, in accordance with the present invention, a half-wave diode rectifier 46 is interposed between one terminal of the solenoid coil and the conductor 41 to convert the alternating current into pulsating direct current. As a result, instead of a frequency of 7200 impulses per minute, the frequency of impulses is reduced to 3600 per minute producing a substantial increase in the amplitude of vibration of the plug 30. Inasmuch as the amplitude of the valve 30 is increased, the finely divided material is agitated, jarred and jolted more vigorously in the conical portion 25 and the tubular portion 26 of the valve, bridging of the material in the valve is prevented and a more uniform discharge of the material is assured. In this way, beverages of uniform strength can be prepared consistently, even with instant tea concentrates of varying particle size and physical properties.

While the invention has been described with respect to an iced tea dispenser, it will be apparent that it is also useful in other fields and may even be used for the dispensing of other powdered materials from hoppers, bins and the like where bridging of the finely divided material frequently occurs due to the normal tendency of such materials to pack bridge and hang even when they are considered to be light, finely divided and free-flowing. Accordingly, the form of the invention disclosed herein should be considered as illustrative and not as limiting.

I claim:

1. A solenoid valve comprising a member having a passage therein, a valve member in said passage, means in said member engageable by said valve member to close said passage, a solenoid coil having a pair of terminals adapted to be connected to a source of alternating current, an armature in said coil and connected with said valve member, and a half-wave rectifier connected to one of said terminals and interposed between said coil and said source for supplying pulsating direct current to said coil to displace said armature and valve member to open said passage at least partially and vibrate said armature axilly of said coil and simultaneously vibrate said valve member.

2. A dispensing device comprising a container for receiving a finely divided material, a mixing chamber below said container, a nozzle communicating with said container for discharging said material into said mixing chamber, a valve member in said nozzle and movable between positions permitting and preventing discharge of said material into said mixing chamber, an armature on said valve member, a solenoid coil adapted to be connected to a source of alternating current for energization thereby to displace said armature and said valve member and permit discharge of said material, and a half-wave rectifier interposed between said coil and said source to energize said coil with pulsating direct current and cause said armature and valve member to vibrate with substantial amplitude.

3. The dispensing device set forth in claim 2 comprising means for admitting water into said mixing chamber, a valve in said means, solenoid means for opening and closing said valve, a switch interposed between said solenoid means, said coil and said source for energizing said coil and said solenoid means to admit water and discharge said material into said mixing chamber simultaneously.

4. The dispensing device set forth in claim 3 comprising means responsive to said switch and connected thereto for heating at least part of the water admitted into said mixing chamber.

References Cited by the Examiner

UNITED STATES PATENTS

| | | |
|---|---|---|
| 2,366,415 | 1/45 | Lindsay. |
| 2,526,735 | 10/50 | Duce _____ 222—196 |
| 2,616,607 | 11/52 | Perkins _____ 141—369 X |
| 2,682,976 | 7/54 | Melikian et al. ____ 222—129.3 X |
| 2,702,655 | 2/55 | Lopata _____ 222—146 X |
| 2,852,170 | 9/58 | Reynolds _____ 222—246 X |
| 2,907,929 | 10/59 | Lawson _____ 317—151 X |
| 2,911,901 | 11/59 | Totten et al. _____ 222—76 X |
| 2,979,231 | 4/61 | Witherspoon _____ 222—83.5 |
| 3,088,053 | 4/63 | Gately _____ 317—151 X |

RAPHAEL M. LUPO, *Primary Examiner.*